3,217,064
METHOD OF PRODUCING ETHYLENE
Robert E. McGreevy and Joseph E. Milam, New Martinsville, W. Va., assignors to Pittsburgh Plate Glass Company, Pittsburgh, Pa., a corporation of Pennsylvania
No Drawing. Filed Oct. 25, 1961, Ser. No. 147,451
7 Claims. (Cl. 260—683.3)

This application is a continuation-in-part of my copending application, U.S. Serial No. 110,348 filed May 16, 1961, now abandoned.

The present invention relates to an improved process for the production of olefins from saturated hydrocarbons. More particularly, the present invention relates to preparation of ethylene from ethane. Still more particularly, the present invention relates to a process for manufacturing chlorinated hydrocarbons and ethylene.

It is known in the art to prepare chlorinated hydrocarbons from saturated aliphatic hydrocarbons and their chlorinated derivatives by recourse to modified Deacon type oxychlorination procedures. Thus, an oxychlorination procedure may conveniently involve the chlorination of a hydrocarbon and/or a chlorohydrocarbon with hydrogen chloride, and an oxygen containing gas such as air or elemental oxygen in the presence of a metal halide catalyst at elevated temperature. In a process of this nature, the hydrogen chloride is believed to be oxidized in the presence of the catalyst to chlorine and water and the chlorine liberated in this manner from the hydrogen chloride reacts with the hydrocarbon or chlorinated hydrocarbon present in the feed to the reaction zone to form further chlorinated hydrocarbons and HCL. HCL produced by the chlorination part of the procedure is then further utilized to supply additional chlorine in the process.

In another modification of an oxychlorination process, elemental chlorine is used as the feed source. In this latter type operation, hydrogen chloride is generated by the chlorination of the hydrocarbon and/or hydrocarbon chloride fed with elemental chlorine to the catalyst reaction zone. Thus, free chlorine, an oxygen containing gas, and a hydrocarbon and/or a chlorohydrocarbon are passed in contact with the metal halide catalyst maintained at elevated temperature. The chlorine presumably reacts with the hydrocarbon and/or chlorohydrocarbon to produce hydrogen chloride and a chlorinated product of the organic feed. The chlorine content of the hydrogen chloride produced in this manner is then utilized to achieve additional chlorinations by the standard Deacon type procedure in which the hydrogen chloride is oxidized to water and elemental chlorine.

In applying these oxychlorination principles to the chlorination of ethane, it has been found in accordance with the practice of this invention that a convenient low temperature method of preparing ethylene in large quantities from an ethane source is provided. Thus, in oxychlorinating ethane, utilizing either chlorine or HCl as the chlorinating agent and oxygen in the presence of a catalyst, large quantities of ethylene are readily produced along with the chlorinated hydrocarbons normally expected in such a procedure. Since most processes for the production of ethylene involve the decomposition of petroleum derived hydrocarbons by high temperature thermal decompositions, certain advantages are readily obtained by producing ethylene in the manner taught herein. Thus, low temperatures may be utilized and while a catalyst material is required for adequate production of the ethylene product the catalyst has an extremely long life and thus gives rise to an economical overall process for the production of ethylene.

In a further embodiment of the present invention, a process is provided which produces gas streams having a predominant quantity of ethylene present therein and desirable chlorinated hydrocarbon derivatives of the ethane feed material. Thus, in accordance with the teachings of this invention, ethane may be oxychlorinated in the presence of a chlorinating agent of the group consisting of HCl, $Cl_2$ and mixtures of HCl and $Cl_2$ to provide a hydrocarbon and chlorohydrocarbon gaseous product mixture in which the ethylene portion represents between 30 and 50 percent by volume basis the ethane fed while the chlorinating hydrocarbon products are predominantly vinyl chloride and ethyl chloride.

In operating the process of the present invention, the oxychlorination catalyst zones utilized to produce the ethylene from the ethane hydrocarbon feed are operated typically in a temperature range of between 400° C. to 650° C. Preferably the temperature of the zones are regulated to provide a temperature between 470° C. to 550° C.

The catalysts employed for the oxychlorination reactions described herein may conveniently comprise any of the well known oxychlorination or Deacon type reaction catalysts impregnated on a suitable carrier or support. The catalysts of the type normally employed in an oxychlorination reaction are metal halides, preferably chlorides of a multi-valent metal such as copper, iron, chromium, etc. These metal halides preferably are used as chlorides and may be utilized alone or may be combined with other metals such as alkali metal chlorides or alkali earth metal chlorides or mixtures thereof. Generally speaking, any effective Deacon type metal halide catalyst will produce chlorinated hydrocarbons and the desired ethylene product from the reactants being fed to the oxychlorination zone. However, a particularly effective method for the oxychlorination of ethane to produce large quantities of ethylene has been found in a copper chloride-potassium chloride catalyst impregnated on a porous carrier. Generally, equi-molar proportions of copper chloride and potassium chloride are employed in preparing the solutions from which the catalyst is deposited on the carrier but amounts of copper chloride in excess of equimolar proportions are sometimes employed. The selection of the particular carrier to be employed will depend in great measure upon the type of process contemplated, that is, whether a fixed bed operation or a fluid bed operation is contemplated. Typical of the carrier materials which may be employed are silica, alumina, fuller's earth, keiselguhr, pumice, and other like materials.

In an operation of a fluid bed, a particularly effective catalyst carrier has been found in Florex, a treated fuller's earth manufactured by the Floriden Corporation. In fixed bed operation, Celite (a calcinated diatomaceous earth manufactured by the Johns-Manville Corporation) has been found to be an extremely effective carrier material. Celite has also been found to be an effective carrier material in fluid bed operation though its attrition qualities render it somewhat less desirable than Florex for this purpose.

The catalytic material employed is placed upon the carrier in any conventional manner. Thus, carrier particles may simply be immersed in aqueous solutions containing the catalytic components and the water of solution evaporated from the carrier particles upon their removal from the solution. If desired, catalytic material may be sprayed upon particles placed in mixing devices such as rotating tumblers, mixmullers, etc., the solution evaporated therefrom by drying during the mixing operation. Another effective method for impregnating carrier particles with catalyst material involves spraying into a fluidized bed of carrier particles a solution containing the catalyst. During the fluidation and impregnation of the carrier particles, heat is applied to the fluidized bed by means of hot inert fluidizing gases to vaporize the water solution therefrom and leave behind a fluidized bed of carrier particles uniformly impregnated with catalytic materials.

In discussing fluidized beds in the specification and claims, it is to be understood that the term "fluidized bed" is employed in the broad sense. In conducting fluid bed processes, gaseous reactants of varying velocities are passed upwardly through a bed of finely-divided solid catalyst-containing particles. When a gas is passed through a bed of solid particulate material, several different conditions may be established depending upon the gas velocity, size of the particles, and other similar considerations. Thus, if the gas velocity is low, the bed of solids remains static. As the gas velocity is increased in the bed, some of the particles become dynamically suspended in the upwardly rising gas stream. As a result, the bed height expands and a bed which is termed "a dynamic bed" is established. If the gas velocity is still further increased, the particles all become suspended and the bed expands even further. Ultimately, the bed may assume a highly turbulent condition which in many ways resembles a boiling liquid. The present process may be applied to either a dynamic bed or a bed resembling the boiling liquid type and both beds are embraced by the term "fluidized bed" herein employed. The exact conditions requisite to establishing either of the bed conditions depends upon factors such as particle size of bed components, gas velocities, density of the particles, etc. Wilhelm and Kwauk, Chemical Engineering Progress, volume 44, page 201 (1948), equate the various factors necessary for fluidizing a bed and by following the principles therein discussed the desired bed conditions may be provided.

In conducting the oxychlorinations contemplated by the present invention to produce gas streams containing chlorinated hydrocarbons and predominant quantities of ethylene from ethane, the ratio of gases is regulated to provide certain quantities of each material. Thus, when chlorine is utilized as the chlorinating agent, the feed ratios of the gaseous materials fed to the oxychlorination catalyst zones typically range from 0.3 mole of chlorine per mole of hydrocarbon to 2.0 moles of chlorine per mole of hydrocarbon. When HCl is utilized as the chlorinating agent, the feed ratio of the gaseous materials fed to the oxychlorination catalyst zones typically range between 0.6 mole of HCl per mole of hydrocarbon and/or chlorohydrocarbon to 4.0 moles of HCl per mole of hydrocarbon. Preferably, the molar ratio of chlorine to hydrocarbon is controlled to provide 0.5 mole of chlorine per mole of hydrocarbon to thereby produce ethylenically unsaturated hydrocarbons having a low chlorine content such as vinyl chloride, ethyl chloride and the like, these products being predominantly produced using the catalytic process of the instant invention. Similarly, when HCl is employed as the chlorinating agent, the molar ratio of HCl to hydrocarbon and/or chlorohydrocarbon is controlled by controlling feed ratio to provide 1.0 mole of HCl per mole of hydrocarbon. It will, of course, be understood by those skilled in the art that where mixtures of HCl and $Cl_2$ are employed the mole ratios of chlorinating agent to hydrocarbon will be controlled to provide the above desired ratios with respect to HCl and $Cl_2$ taking into consideration the proportion of each chlorinating agent present in the mixture fed.

In supplying oxygen to the oxychlorination reaction zones, the feed ratio of oxygen to chlorine is controlled by controlling the feed rates of these materials so that between 0.2 mole of oxygen per mole of chlorine to 2.4 moles of oxygen per mole of chlorine are fed to the reaction zones. As will be understood by the skilled art, when air is employed, the ratio of oxygen to chlorine remains the same but the quantity of oxygen containing gas is increased by the quantity of other gases present in the air. Typically with air as the feed gas and chlorine in the chlorinating agent, the mole ratio of air to chlorine is controlled to between 1 mole of air per mole of chlorine to 12 moles of air per mole of chlorine. Preferably, the oxygen is supplied in quantities sufficient to provide 1 mole of oxygen per mole of chlorine. With air, 5 moles of air are supplied per mole of chlorine. With HCl as feed in place of chlorine, the ratio of oxygen to HCl is controlled to provide from 0.2 mole of $O_2$ per mole of HCl fed to 2.4 moles of oxygen per mole of HCl fed. Preferably, this ratio is maintained to supply 1 mole of $O_2$ per mole of HCl. Similarly with air as feed, the feed rates are controlled to supply between 1 to 12 moles of air per mole of HCl and preferably 5 moles of air per mole of HCl.

For a more complete understanding of the present invention with respect to the production of ethylene from ethane by an oxychlorination procedure, the following examples illustrate one of the modes which may be employed in conducting this reaction:

EXAMPLE I 441 grams of $CuCl_2 \cdot 2H_2O$, 186.8 grams of KCl were dissolved in 1,000 milliliters of distilled water. To this solution was added 1,000 milliliters of sized Celite pellets which were cylindrical in shape. The pellets were ¼ inch in length and ¼ inch in diameter. After the pellets were soaked for 24 hours in the solution, the supernatant liquid was drained off and the pellets allowed to dry in air.

A 1½ inch internal diameter stainless steel tube 5 feet in length was used as a reactor. The catalyst prepared as above was placed in the reactor to provide a catalyst bed 26 inches in length. The reactor was placed in a vertical position and surrounded by a steel jacket. The jacket was filled with a mixture of salts (sodium nitrate, sodium nitrite and sodium chloride) and these salts were maintained in a molten state during operation. Strip heaters were placed around the jacket to heat it during start-up and a thermo regulator was connected to the heaters and the molten salt to insure maintaining the salt at 450° C. during operation.

Gases were fed to the tube through an inlet opening in the bottom and products were removed from the top through a discharge line. The gases as introduced were measured through rotometers and the products removed were water and caustic scrubbed and then condensed in dry ice-acetone cold traps.

Using this equipment and catalyst, several runs were made with ethane, chlorine and air to produce vinyl chloride. The results are set forth below in Table I:

*Table I*

| Run No. | 1 | 2 |
|---|---|---|
| Feed rate (moles/min.): | | |
| Ethane | 0.024 | 0.020 |
| Chlorine | 0.012 | 0.009 |
| Air | 0.104 | 0.088 |
| Temperature, ° C. (average) | 485 | 479 |
| Contact time* (seconds) | 1.2 | 1.4 |
| Productivity (basis mole percent of ethane fed) | | |
| Vinyl chloride | 32.8 | 29.2 |
| Ethyl chloride | 4.43 | 5.75 |
| Perchloroethylene | 0.13 | 0.16 |
| Trichloroethylene | 0.38 | 0.33 |
| 1,2-dichloroethane | 2.87 | 2.92 |
| Dichloroethylene | 2.35 | 0.18 |
| 1,1,2-trichloroethane | 0.26 | 0.16 |
| Chloroform | 0.04 | 0.8 |
| Methylene chloride | 1.15 | 0.11 |
| Methyl chloride | 2.62 | 2.16 |
| Ethylene | 44.3 | 50.5 |
| Ethane burned | 16.2 | 19.3 |

*Residence time gases were in the reactor tube.

EXAMPLE II

Utilizing the catalyst and the reaction system of Example I, ethane, HCl, and air, are fed to a reactor in the following feed ratios:

| | |
|---|---|
| Ethane | 0.024 |
| HCl | 0.024 |
| Air | 0.104 |

The average temperature is maintained at 485° C., contact time is regulated to between about 1.2 seconds to 1.4 seconds. Operating in this manner, a chlorinated hydrocarbon stream is obtained containing predominant quantities of ethylene, that is, 30 to 40 percent and large quantities of vinyl chloride 25 to 35 percent.

EXAMPLE III

Utilizing the catalyst and reactor system of Example I, ethane, a mixture of HCl and $Cl_2$ and air are fed to a reactor at the following feed rates:

Feed rate (Molar/min.):

| | |
|---|---|
| Ethane | 0.024 |
| HCl | 0.012 |
| Chlorine | 0.006 |
| Air | 0.104 |

During the run, the temperature is maintained at 485° C., contact time is regulated to between 1.2 to 1.4 seconds. Operating in this manner, a chlorinated hydrocarbon stream is obtained which contains predominant quantities of ethylene, that is, 30 to 40 percent and large quantities of vinyl chloride 25 to 35 percent.

EXAMPLE IV

Celite V (a calcinated diatomaceous earth manufactured by Johns-Manville Corporation) ranging in particle size between 35 and 80 mesh is utilized as the carrier material for the oxychlorination catalyst. Four hundred (400) grams of 35 to 80 mesh Celite material was placed in a rototumbler, the device is actuated to rotate and is heated to a temperature of 140° C. A stock solution is prepared by dissolving 440 grams of copper chloride ($CuCl_2.2H_2O$), 186 grams of potassium chloride (KCl), and 1,000 cc.'s of water. Two hundred and ninety-five (295) grams of the copper chloride-potassium chloride stock solution is diluted to 1333 cc.'s with distilled water and is utilized as the catalyst carrying material. This diluted solution is added to the material contained in the rototumbler in drop-wise fashion and the rototumbler is continuously heated during the addition. After the solution is added, the impregnated carrier is dried in the rototumbler by rotating it for an additional thirty minutes while heating the contents to a temperaure of 140° C. Based upon the total weight of the carrier, the finished catalyst contains 6 percent by weight copper on an anhydrous basis.

EXAMPLE V 2 inch internal diameter reactor tube 5 feet in height is employed as a fluidized bed reactor. The reactor is packed from a point 1 foot from the bottom to a depth of 1½ feet with the catalyst prepared as in Example IV. The entire reactor tube is placed vertically in an electric furnace with the bottom and the top of the reactor protruding from the top and the bottom of the furnace, respecively, so that the entire catalyst bed contained in the reactor is surrounded by the electric furnace. An inlet opening is provided in the bottom of the reactor below a porous glass disc serving as a distributor plate and located 1 foot from the bottom of the reactor tube. Attached to the inlet opening through a common gas line are three feed gas lines, one for ethane, one for chlorine or HCl and one for air. Gas is fed to the reactor through the opening, passed into the bed through the distributor plate. A product discharge line is located in the upper portion of the reactor and all gaseous products are removed from the reactor through this line. The gaseous products so removed are passed through two condensers connected in series and a common receiver where HCl and water are collected. The gases are then passed through a series of Dry Ice-acetone cold traps and the hydrocarbon chlorides are collected therein in an iso-octane solvent. Utilizing the above equipment, a series of runs are made at temperatures ranging between 498° C. to 501° C. Using HCl as the chlorinating agent and pure oxygen as the oxygen supply, the input gas ratio of ethane to HCl to oxygen is 1 to 1 to 1 on a molar basis. Operating in this manner, a gaseous product stream is obtained containing between 40 to 50 percent vinyl chloride on a molar basis the organic chloride collected and ethyl chloride ranging between 20 to 25 percent basis the organic chloride selected. The ethylene content of streams produced in the above manner is found typically to be between 30 to 50 percent by volume basis the ethane fed.

EXAMPLE VI

Utilizing the catalyst of Example IV and the equipment of Example V, a series of runs are made in which ethane, chlorine, and air are utilized as feeds. The average temperature during the reaction is maintained at 500° C. and the molar ratio of ethane to chlorine to air is maintained at 1 to 0.50 to 5.00. Operating in this manner, a gas stream is produced which contains on a volume basis 35 to 50 percent ethylene and 46 to 47 percent vinyl chloride basis the total organic chloride content of the product stream.

While the invention has been described with reference to certain specific examples, it is to be understood that the invention is not intended to be limited thereby except insofar as appears in the accompanying claims.

We claim:

1. A method of producing ethylene comprising introducing ethane, an oxygen containing gas and a chlorinating agent selected from the group consisting of HCl, $Cl_2$ and mixtures of HCl and $Cl_2$ into an oxychlorination catalyst zone having a copper chloride containing catalyst present and operating at a temperature of between 400° C. and 650° C.

2. A method of producing ethylene comprising introducing ethane, HCl, and an oxygen containing gas into a fluidized bed of copper chloride containing catalyst particles operated at a temperature of 400° C. to 650° C., the mole ratio of ethane to HCl to oxygen being 1 to 1 to 0.5 to thereby produce a chlorinated hydrocarbon gaseous product stream containing 30 to 50 percent ethylene therein.

3. A method of producing ethylene comprising introducing ethane, chlorine, and an oxygen containing gas into a copper chloride containing catalyst zone operated at a temperature of 400° C. to 650° C., the mole ratio of ethane to chlorine to oxygen being 1 to 0.5 to 0.5 to thereby produce a chlorinated hydrocarbon stream containing predominant quantities of ethylene therein.

4. A method of producing ethylene comprising introducing ethane, an oxygen containing gas and a chlorinating agent selected from the group consisting of chlorine, HCl, and mixtures of chlorine and HCl into an oxychlorination metal halide catalyst zone operated at a temperature of 400° C. to 650° C. to thereby produce a hydrocarbon chloride stream containing predominant quantities of ethylene, removing said stream from the catalyst zone and cooling the said stream to separate the hydrocarbon chloride content from the ethylene.

5. The method of claim 4 wherein the chlorinating agent is HCl.

6. The method of claim 4 wherein the chlorinating agent is $Cl_2$.

7. The process of claim 4 wherein the chlorinating agent is a mixture of HCl and $Cl_2$.

References Cited by the Examiner
UNITED STATES PATENTS

| | | | |
|---|---|---|---|
| 2,315,499 | 4/43 | Cantzler et al. | 260—683.3 |
| 2,838,577 | 6/58 | Cook et al. | 260—656 |
| 2,952,714 | 9/60 | Milam et al. | 260—662 |
| 2,957,924 | 10/60 | Heiskell et al. | 260—662 |
| 2,971,995 | 2/61 | Arganbright | 260—683.3 |

ALPHONSO D. SULLIVAN, *Primary Examiner.*